Nov. 26, 1968 A. H. EICHHOLZ 3,412,905
MARKING ATTACHMENT FOR LAWN SPREADER
Filed Nov. 9, 1965 2 Sheets-Sheet 1
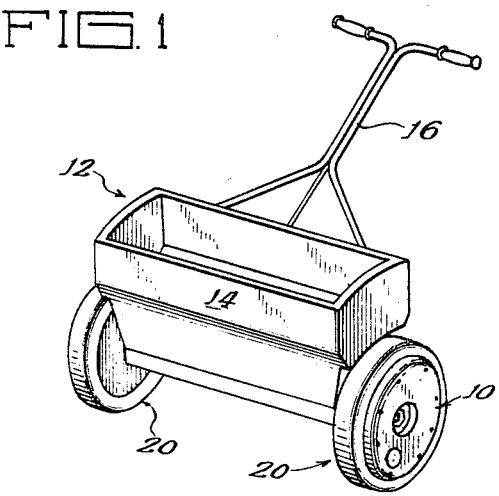
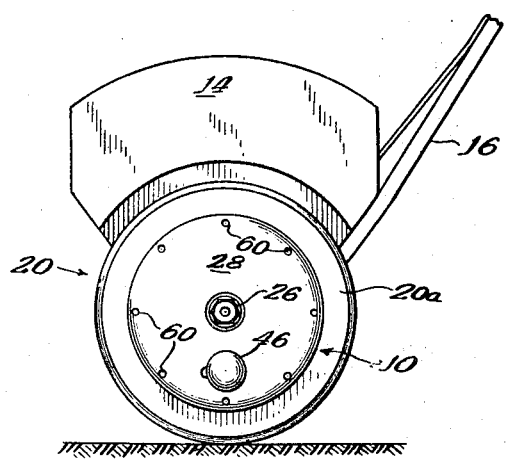
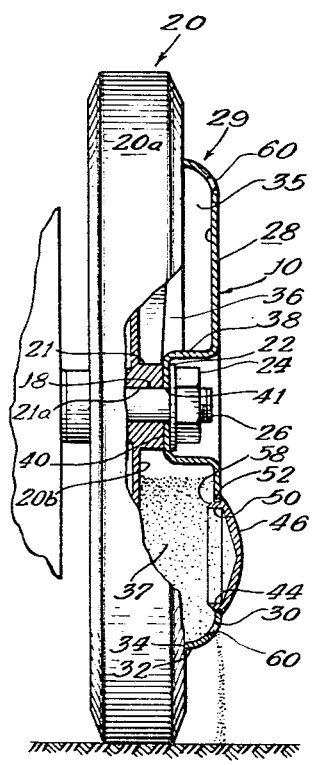
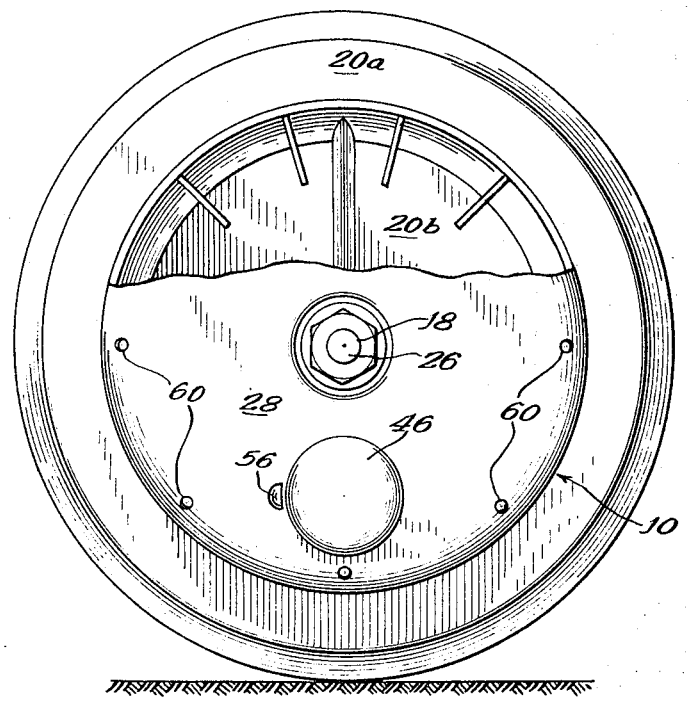
Inventor:
Arthur H. Eichholz
By: Hofgren, Wegner, Allen,
Stellman & McCord
Attorneys Nov. 26, 1968  A. H. EICHHOLZ  3,412,905
MARKING ATTACHMENT FOR LAWN SPREADER
Filed Nov. 9, 1965  2 Sheets-Sheet 2
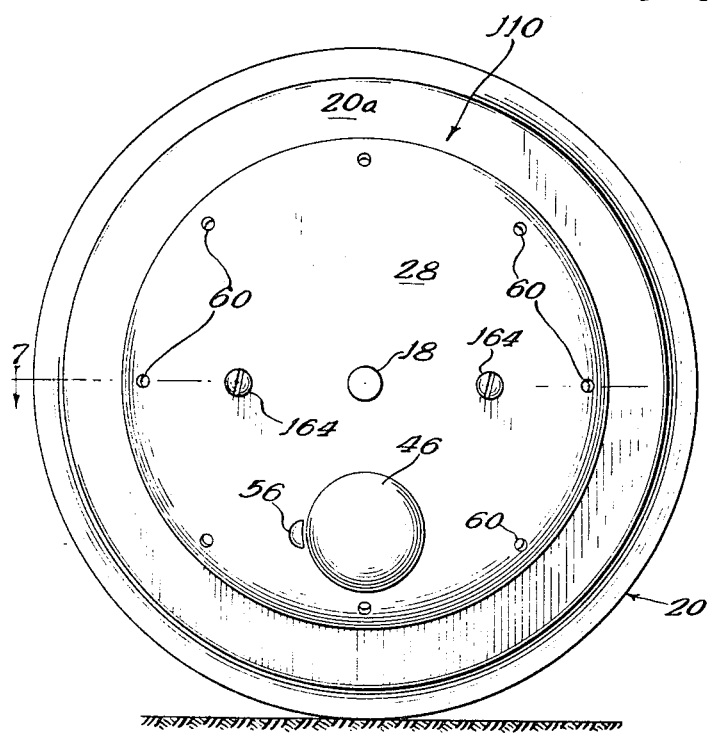
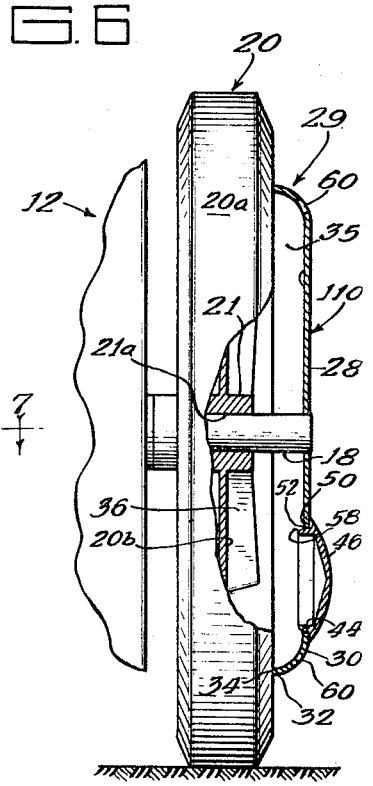
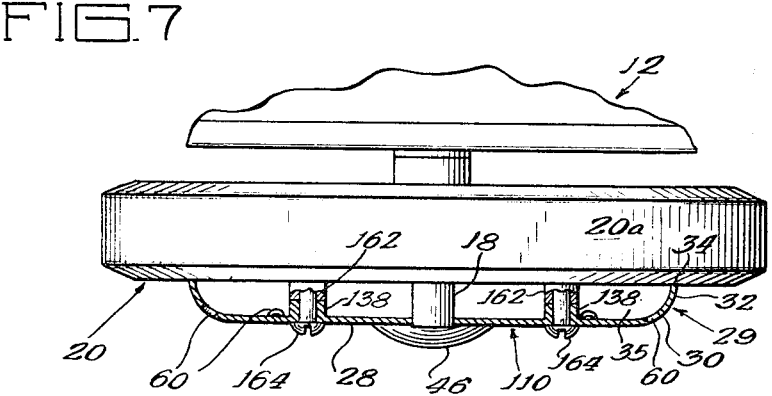

United States Patent Office 3,412,905
Patented Nov. 26, 1968

3,412,905
MARKING ATTACHMENT FOR LAWN SPREADER
Arthur H. Eichholz, Polo, Ill., assignor to Central Quality
Industries, Inc., a corporation of Illinois
Filed Nov. 9, 1965, Ser. No. 506,933
2 Claims. (Cl. 222—169)

ABSTRACT OF THE DISCLOSURE

A marking attachment for a lawn spreader of the type having rotatable wheels supporting a body for the containment and dispensation of the particulate or granulated material, the attachment being generally in the shape of a wheel cover having a generally dished configuration and intended for securement to the wheel to form a chamber therewith for the reception of marking material which may be dispensed out through openings formed near the flanged area of the cover, characterized in that the cover has openings in general alignment with fastening element openings on the wheel, the cover openings being formed in inwardly offset surfaces so as to abut surfaces on the body of the wheel for mounting the cover to the wheel.

---

This application relates to lawn spreading devices and more particularly to a new and improved marking means for use with such lawn spreading devices.

The class of garden implements known as "lawn spreaders" are, typically, wheeled implements supporting a trough-like body having a controllable dispensing chute at the bottom of the trough for selectively dispensing the contents from the trough. These lawn spreaders are frequently used for applying lawn food, weed killer or the like, to the turf. In addition, they may be used for dispensing grass seed.

A problem encountered in dispensing material from lawn spreaders to an established lawn is that it is difficult to visually ascertain the swath of application as the lawn spreader is traversed back and forth over the turf. As a result, the overly cautious user may, by estimate, overlap his previous swath to such a great extent that several spaced relatively wide bands of double application of lawn food are created which may result in extra vigorous turf growth in the areas of double application or, more harmful, may be an overly strong application of lawn food such as to "burn" or kill the turf in the area of double application. In addition, this wasted lawn food requires a greater number of trips back and forth across the lawn because of the overlap, thereby prolonging the length of time necessary to perform the lawn spreading operation.

Conversely, the not too cautious user of the lawn spreader may leave strips between swaths of application which do not receive lawn food, thereby resulting in turf which does not grow as vigorously as the turf in the adjacent swaths and will look comparatively unsightly due to uneven growth and coloration. In addition, especially with the case of weed killing material, the result may be a lawn having spaced strips infested with weeds wherein the material was not applied to the turf.

Some attempts have been made to provide a means on lawn spreading devices for applying a marking material to the turf so that the user or operator of the lawn spreader may visually determine the marginal extent of his previous swath. However, most of these means have taken the form of some relatively complex device involving gearing and other associated structures such as to render the devices relatively expensive. In addition, they have typically possessed a relatively significant degression of bulk so that as an attachment to the lawn spreader they detract from the appearance of the spreader in addition to being a bothersome projection which may strike trees, shrubs, and may easily and painfully be struck by the ankle or foot of the user.

It is therefore a primary object of this invention to provide a new and improved lawn marking attachment for a lawn spreading device.

It is another object of this invention to provide a lawn marking attachment for a lawn spreading device which is inexpensive and does not significantly add to the bulk of the lawn spreader nor detract from the generally decorative appearance thereof.

It is a further object of this invention to provide a new and improved lawn marking attachment for a lawn spreader which is compact and easily assembled on the lawn spreader.

Yet another object of this invention is to provide a new and improved lawn marking attachment for a lawn spreader which is free of any moving parts thereby being virtually maintenance free and dependable in operation.

Still another object of this invention is to provide an attachment for a lawn spreader which cooperates with existing unmodified structure of a conventional lawn spreader to provide an inexpensive, trouble-free, compact means for holding and applying a marking material as the lawn spreader is driven through a lawn food applying swath over the ground to produce an easily recognizable swath margin indicating line.

Other objects, features and advantages of the present invention will be apparent from the following description of the preferred embodiments illustrated in the accompanying drawings, in which:

FIGURE 1 is an isometric view of a lawn spreading device embodying the novel lawn marking means of this invention;

FIGURE 2 is a side elevational view of the lawn spreading device shown in FIGURE 1;

FIGURE 3 is an enlarged fragmentary view partially broken in section showing the novel lawn marking device of this invention attached to the wheel of a lawn spreading device;

FIGURE 4 is a partially broken enlarged end view of the wheel and lawn marking attachment shown in FIGURE 3;

FIGURE 5 is an enlarged end view of the wheel of a lawn spreading device with a modified form of the lawn marking device of this invention attached thereon;

FIGURE 6 is a fragmentary enlarged end view partially broken in section of the wheel and modified marking attachment shown in FIGURE 5; and FIGURE 7 is a fragmentary enlarged, partially broken in section, top view of the wheel and marking attachment shown in FIGURES 5 and 6.

The lawn marking attachment 10 of this invention is intended for use with a lawn spreader generally indicated 12. Typically such lawn spreading devices have a hopper-like body 14 for holding fertilizing or weed killing granular material or the like with an upwardly and outwardly extending handle 16 affording a means for controlling and pushing the spreader over the ground. Generally the hopper body is mounted on an axle 18 which rotatably supports wheels 20.

These wheels include a tire portion 20a made of rubber or the like and a rim 20b formed of metal or plastic. The rims, in turn, may be provided with a hub 21 having a shaft opening 21a for telescoping the wheels over the axle. Washers 22 may be provided between the hub portion of the rim and a nut 24 threaded on the threaded end 26 of the axle for rotatably securing the wheels to the axle.

The lawn marking attachment 10 of this invention preferably takes the form of a disc-like body 28 which is dished to provide a peripheral flange generally indicated at 29. Preferably the attachment is made of a plastic material though it is to be understood that other materials, such as metal, would suffice. The flange includes a first circumferential curved surface 30 bending outwardly away from the body and a second ring-like circular cylindrical surface 32 terminating in a circular edge 34 which lies in a plane spaced from the plane of the body portion 28 and preferably is slightly larger in diameter than the wheel rim so that the edge will abut the tire side wall when the attachment is assembled. The flange 29 gives a depth to the attachment which creates a cavity, generally indicated 35, between the plane of the edge 34 and the body portion 28. This by itself, or in cooperation with the cavity 36 afforded by rim 20b, provides a marking material reservoir when the attachment is assembled on the lawn spreader wheel as shown for storing and dispensing marking material 37 such as lime, flour, or the like.

The attachment is further provided with means for securing the same to a lawn spreader wheel. In the preferred embodiment, this means is shown as including an inwardly directed boss 38 on the body portion which extends in the same direction as the flange for an extent sufficient to place the inward end 40 of the boss immediately adjacent the outer portion of the rim hub when the edge 34 abuts the wheel in the assembled condition. The boss inner end 40 is provided with an axle receiving opening 41 so that the attachment may be telescoped over the wheel axle and the washer 22 and nut 24 may be threaded exteriorly of the attachment onto the axle to hold both the attachment and the wheel on the axle for rotation. In this fashion, the wheel forms the completing side or remaining portion of the enclosure defined by the material handling reservoir so that marking material may be stored therein.

The body 28 of the attachment is provided with a marking material filler opening 44 and a cap 46 for covering the opening. The cap 46 includes an enlarged head 48 which is of a peripheral extent greater than the opening 44. A neck 50 projects outwardly from the head and extends through the opening 44. The underside 52 of the enlarged head and the enlarged portion 54 of the free end of the neck lock the cap against axial withdrawal from the opening. It is intended that the cap 46 will be formed of a slightly deformable material so that by digital manipulation, preferably in the area of the finger indentation 56 formed on the body of the attachment adjacent opening 44, the cap may be withdrawn from the opening to permit filling the cavity with marking material. It is to be noted that the extreme or free end of the neck is provided with a cam surface 58 to assist in forcing the enlarged portion through the opening when the cap is reassembled to close the opening.

The attachment is further provided with a means for feeding marking material onto the ground in a swath margin indicating line or a plurality of marking material feed openings 60. In the preferred embodiment, these openings are formed in the curved portion 30 of the attachment. It is possible that these openings could be formed in the cylindrical portion 32 of the flange, the general consideration being that the openings should be formed so that marking material dispensed through the openings, may fall unobstructed to the ground within a plane which is very closely adjacent the lateral extent of the swath of material deposited by the lawn spreader. The closer the openings are formed to the tire, or, in other words, closer to the ring-like edge 34, the greater the likelihood that the material will catch on the tire and not fall freely on the ground to make the margin indicating line. The farther the openings are formed away from the tire, or, in other words, toward the center of the body, the geater will be the disparity between the indicating line produced and the actual lateral extent of the swatch of lawn food deposited by the lawn spreader.

In use, an attachment 10 is assembled on each of the laterally spaced wheels of a lawn spreader by removing the nuts and washers, telescoping the attachment over the axle and replacing the nuts and washers. In this fashion, the edge 34 tightly abuts the side of the wheel, preferably in the vicinity of the tire side wall to provide a good seal at this point and forms therewith a reservoir for the reception of marking material. The filler cap is then opened and marking material is poured into the reservoir and the cap replaced.

As the lawn spreader is pushed back and forth across the lawn, granules of marking material will leave a visible line (continuous or interrupted depending on the number of openings 60) which indicates the general margin of the swath of lawn food deposited on the turf. Actually the indicating line deposited will be slightly outside of the swath of food deposited on the lawn, but this may be easily compensated for by guiding with the inside of one of the wheels on the indicating line.

The modified form 110 of the attachment of this invention is similar in most respects to the attachment 10 except that the means for securing the attachment is different. Here the attachment 110 is provided with a pair of inwardly directed bosses 138 radially spaced from the center of the disc and generally opposite each other. It is intended that these bosses will mate with bosses 162 on the wheel rim and that a screw 164 or similar fastening arrangement may extend through the bosses to fasten the attachment to the wheel and form the marking material reservoir therewith. In other respects, the attachment 110 is similar to that described with respect to attachment 10 and similar numerals have been indicated to describe similar structures.

The marking attachment 10 of this invention is relatively compact, yet decorative, so as not to detract from the overall trim appearance of lawn spreading devices. It may be simply and easily attached and removed from a lawn spreader requiring no change in structure of the lawn spreader. In addition, it is very easily filled with marking material. No moving parts are involved and thus the attachment is virtually maintenance free. Any clogging which might occur may be remedied by simply inserting a member into the several feed holes to unclog the same. Only two parts are involved, the basic disc-like member and the removable cap, and both of these may be very economically formed, preferably of a slightly deformable plastic material, but it is understood that other materials could be used equally as well. In either event, the actual formation of the attachment is simple and inexpensive, the materials used are equally economical; and yet this inexpensive, fool-proof, simply installed and easily maintained marking attachment functions excellently in use.

The foregoing detailed description has been given for clearness of understanding only, and no unnecessary limitations should be understood therefrom, as some modifications may be obvious to those skilled in the art.

I claim:

1. A lawn marking attachment for use with a lawn spreader having an axle and wheels rotatably mounted on the axle for providing a means for storing and dispensing marking material to produce a guide line indicating the width of a previous lawn spreading swath, comprising: a disc-like body having a generally dished configuration with a peripheral flange terminating in an edge spaced from the center of the body; cooperating means on the body for mounting the body in cooperating relationship to a lawn spreader wheel to form an enclosed marking material reservoir therewith; said means including a surface offset inwardly in the direction of the flange a distance sufficient to generally abut the wheel about the axle when the flange abuts the wheel about a generally circumferentially spaced line, the offset surface having an opening therethrough for receiving the wheel axle and being thin in cross section adjacent the opening; a filler opening in the body for supplying marking material to the reservoir afforded by assembling the body to the lawn spreader wheel; and a plurality of marking material feed openings formed in the flange portion of the body to provide a means for dispensing marking material from the reservoir onto the ground as the wheels are rotated to produce a visible swath margin indicating line as the spreader is moved over the ground during normal spreading operation.

2. The lawn marking attachment of claim 1 wherein said means for securing the body to a wheel includes a generally centrally located offset hub portion formed in the body with a centrally formed axle opening therein for telescoping the body over a lawn spreader axle to secure the same thereto.

References Cited

UNITED STATES PATENTS

| 212,581 | 2/1879 | Wright. | |
| 2,099,489 | 11/1937 | Lambert. | |
| 2,130,881 | 9/1938 | Frank. | |
| 92,144 | 6/1869 | Arrington | 222—169 X |
| 2,832,509 | 4/1958 | Emanatian | 222—169 X |
| 3,079,049 | 2/1963 | Barnhard | 222—169 |

FOREIGN PATENTS 490,617  1/1919  France.

ROBERT B. REEVES, *Primary Examiner.*

N. L. STACK, *Assistant Examiner.*